(12) United States Patent
Carlson et al.

(10) Patent No.: US 10,082,825 B2
(45) Date of Patent: *Sep. 25, 2018

(54) METHOD AND SYSTEM FOR TIME SYNCHRONIZATION AMONG SYSTEMS USING PARALLEL SYSPLEX LINKS

(71) Applicant: International Business Machines Corporation, Armonk, NY (US)

(72) Inventors: Scott M. Carlson, Tucson, AZ (US); David A. Elko, Austin, TX (US); Richard K. Errickson, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/056,394

(22) Filed: Feb. 29, 2016

(65) Prior Publication Data

US 2016/0179130 A1 Jun. 23, 2016

Related U.S. Application Data

(63) Continuation of application No. 14/492,972, filed on Sep. 22, 2014, now Pat. No. 9,298,523, which is a
(Continued)

(51) Int. Cl.
*G06F 15/16* (2006.01)
*G06F 1/12* (2006.01)
(Continued)

(52) U.S. Cl.
CPC .................. *G06F 1/12* (2013.01); *G06F 1/14* (2013.01); *G06F 3/0611* (2013.01);
(Continued)

(58) Field of Classification Search
None
See application file for complete search history.

(56) References Cited

U.S. PATENT DOCUMENTS

| 5,867,564 A | 2/1999 | Bhusri |
| 5,907,685 A | 5/1999 | Douceur |

(Continued)

OTHER PUBLICATIONS

Mills, "Network Tim Protocol (Version 3) Specification, Implementation and Analysis"< RFC 1305, pp. 1-108, http://faqs.org/rfcs/rfc13050.html, Date: Mar. 1992.
(Continued)

*Primary Examiner* — Esther B Henderson
(74) *Attorney, Agent, or Firm* — Scully, Scott, Murphy & Presser, P.C.; Steven Chiu, Esq.

(57) ABSTRACT

Disclosed are a method of and system for providing time synchronization among first and second computer systems, where each of the computer systems includes hardware, operating system software and a layer of microcode operating between said hardware and said software. The method comprises the steps of using the microcode of the first computer system to provide a first timestamp, using the microcode of the second computer system to provide a second timestamp and a third timestamp, and using the microcode of the first computer system to provide a fourth timestamp. The method comprises the further steps of using the first, second, third and fourth timestamps to determine a timing difference between the first and second computer systems, and adjusting the timing among said first and second computer systems on the basis of said determined timing difference. Preferably, the first and second computer systems are connected together by a point-to-point link; and the first timestamp is sent from the first computer system to the second computer system, and the second and third
(Continued)

timestamps are sent from the second computer system to the first computer system over that point-to-point link.

19 Claims, 2 Drawing Sheets

Related U.S. Application Data continuation of application No. 11/247,888, filed on Oct. 11, 2005, now Pat. No. 8,949,468, which is a continuation-in-part of application No. 09/961,013, filed on Sep. 21, 2001, now Pat. No. 7,360,222.

(51) Int. Cl.
*G06F 9/54* (2006.01)
*H04L 29/08* (2006.01)
*G06F 9/50* (2006.01)
*G06F 3/06* (2006.01)
*G06F 12/02* (2006.01)
*G06F 1/14* (2006.01)
*H04J 3/06* (2006.01)

(52) U.S. Cl.
CPC .......... *G06F 3/0655* (2013.01); *G06F 3/0688* (2013.01); *G06F 9/5077* (2013.01); *G06F 9/546* (2013.01); *G06F 12/0238* (2013.01); *H04J 3/0697* (2013.01); *H04L 29/0854* (2013.01); *G06F 2212/202* (2013.01); *H04J 3/0667* (2013.01)

(56) References Cited

U.S. PATENT DOCUMENTS

| | | | |
|---|---|---|---|
| 5,918,040 A | 6/1999 | Jarvis | |
| 6,622,260 B1 | 9/2003 | Marisetty et al. | |
| 6,697,382 B1* | 2/2004 | Eatherton | H04J 3/0632 370/503 |
| 7,043,651 B2* | 5/2006 | Aweya | H03L 7/093 375/356 |
| 2001/0050903 A1 | 12/2001 | Vanlint | |
| 2002/0129290 A1 | 9/2002 | Couillard | |
| 2003/0056136 A1* | 3/2003 | Aweya | H03L 7/093 713/400 |
| 2003/0188038 A1 | 10/2003 | Le et al. | |
| 2004/0093435 A1 | 5/2004 | Purho | |
| 2006/0037027 A1* | 2/2006 | Carlson | G06F 9/546 719/313 |

OTHER PUBLICATIONS

Mills, "Algorithm for Synchronizing Network Clocks", RFC 956, Sep. 1985, pp. 1-27.

\* cited by examiner

METHOD AND SYSTEM FOR TIME SYNCHRONIZATION AMONG SYSTEMS USING PARALLEL SYSPLEX LINKS

CROSS REFERENCE TO RELATED APPLICATIONS

This application is a continuation of co-pending U.S. patent application Ser. No. 14/492,972, filed Sep. 22, 2014, which is a continuation of U.S. application Ser. No. 11/247,888, filed Oct. 10, 2005, which is a continuation-in-part application of U.S. application Ser. No. 09/961,013, for "Extensions to Coupling Channels to Support Multiple Coupling Facility Sharing, Intercepts and Message Passing," filed Sep. 21, 2001. The entire disclosures of U.S. patent applications Ser. Nos. 14/492,972, 11/247,888 and 09/961,013 are hereby incorporated herein by reference.

BACKGROUND OF THE INVENTION

Field of the Invention

This invention generally relates to time synchronization in computer systems. More specifically, the invention relates to methods and systems that are particularly well suited for maintaining time synchronization among plural interconnected computer systems.

Background Art

Over the past several years, computer manufacturers have begun to provide processing architectures based on a multi-system shared data approach. In these architectures, multiple large-scale computer systems are interconnected, through, for example, a coupling facility or other interprocessor communication mechanism, which permits shared memory or shared data. The resulting interconnected complex of computers is commonly referred to as a sysplex (for "system complex").

One important challenge in the design and operation of interconnected, complex computer systems, such as a sysplex, is to maintain all the component systems time synchronized.

Clustered computer systems commonly maintain synchronized time-of-day (TOD) clocks. This common TOD is used to manage distributed tasks among the systems. For example, the common TOD may be used to obtain unique identifiers among the processors, to provide timestamp values for data objects, to provide serialization among distributed tasks, etc. Among systems that are physically close together, the TOD synchronization must be quite accurate. In the past, this has been accomplished through the use of specialized hardware that provides time synchronization signals to all of the clustered processors. As processor speeds increase, the specialized hardware becomes inadequate to the task of close synchronization. In addition, the external time reference (ETR) architecture of the prior art has distance limitations (<40 km) and requires dedicated cabbing and external ETR boxes.

SUMMARY OF THE INVENTION

An object of this invention is to improve time synchronization among interconnected computer systems.

Another object of the present invention is to provide time synchronization, in a complex of interconnected computer systems, using a message-based protocol over a reliable point-to-point connection.

A further object of the invention is to make use of the existing coupling-facility channel architecture, a point-to-point architecture, in a complex of interconnected computer systems, to perform time synchronization that may be used to ensure synchronization to an accuracy on the order of a few microseconds or better.

These and other objectives are attained with a method of and system for providing time synchronization among first and second computer systems, where each of the computer systems includes hardware, operating system software and a layer of microcode operating between said hardware and said software. The method comprises the steps of using the microcode of the first computer system to provide a first timestamp, using the microcode of the second computer system to provide a second timestamp and a third timestamp, and using the microcode of the first computer system to provide a fourth timestamp.

The method comprises the further steps of using the first, second, third and fourth timestamps to determine a timing difference between the first and second computer systems, and adjusting the timing among said first and second computer systems on the basis of said determined timing difference. Preferably, the first and second computer systems are connected together by a point-to-point link; and the first timestamp is sent from the first computer system to the second computer system, and the second and third timestamps are sent from the second computer system to the first computer system over that point-to-point link. Also, the preferred embodiment of the invention uses a command/response protocol that makes use of pre-allocated hardware buffer space that eliminates the possibility of busy situations (e.g., buffer available) and therefore contributes to the capability to send and receive data on a regular and more frequent basis.

More specifically, in the preferred implementation of the invention, the synchronization is based upon four measured time values:
1. the time at which the initiator sends a timing request (t0)
2. the time at which the timing request is received at the target (t1)
3. the time at which the target sends its response (t2)
4. the time at which the response is received at the initiator (t3)

Assuming that the time at the target differs from the time at the initiator by an amount, d, and that the transmission times on the link for the timing request and response are symmetric and have a value of x, the following equations hold:

$$t1 = t0 + d + x$$

$$t3 = t2 - d + x$$

From these equations, it can be shown that:

$$d = \frac{1}{2}[(t1 + t2) - (t3 + t0)]$$

So, estimating the time difference between the systems becomes a matter of collecting samples of the four time measurements, and making the systems agree upon the time becomes a matter of changing the rate of increment of one of the systems clocks, so that the values converge.

The preferred embodiment of the invention, described below in detail, provides time synchronization using a message-based protocol over a reliable point-to-point connection. The invention makes use of the existing coupling-facility channel architecture, a point-to-point architecture, to perform synchronization that ensures synchronization to an accuracy on the order of a few microseconds or better. Existing technologies that do not use specialized hardware currently provide synchronization on the order of milliseconds which does not meet the requirements of some of today's top-end computing systems.

Because the message protocol utilized over the coupling-facility channels is at a layer well below the program software (e.g., at the microcode level), the protocol is capable of inserting send and receive timestamps within messages such that the latency between the timestamp and when the message is actually transmitted/received is minimized. Latencies can occur in protocols that are implemented at the program level due to workloads and concurrent software activity within the OS. In synchronization protocols that make use of send/receive timestamps, variable latencies contribute directly to the error in time synchronization capability. Because coupling-facility channels have a known maximum latency, the accuracy of synchronization can be guaranteed, a critical and essential aspect of multi-system environments such as SYSPLEX that rely on synchronization at the microsecond level.

The message-base protocol utilized over coupling-facility channels is implemented such that it is transparent to the other facilities that utilize coupling-facility channels, such as the message facility and coupling facility. This is done by adding a bit in the header of each message packet that automatically causes the packet to be routed to the message-protocol microcode rather than to other facilities. Additionally, because the timing message packets are small and relatively infrequent, the performance impact on the coupling-facilities is minimal.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
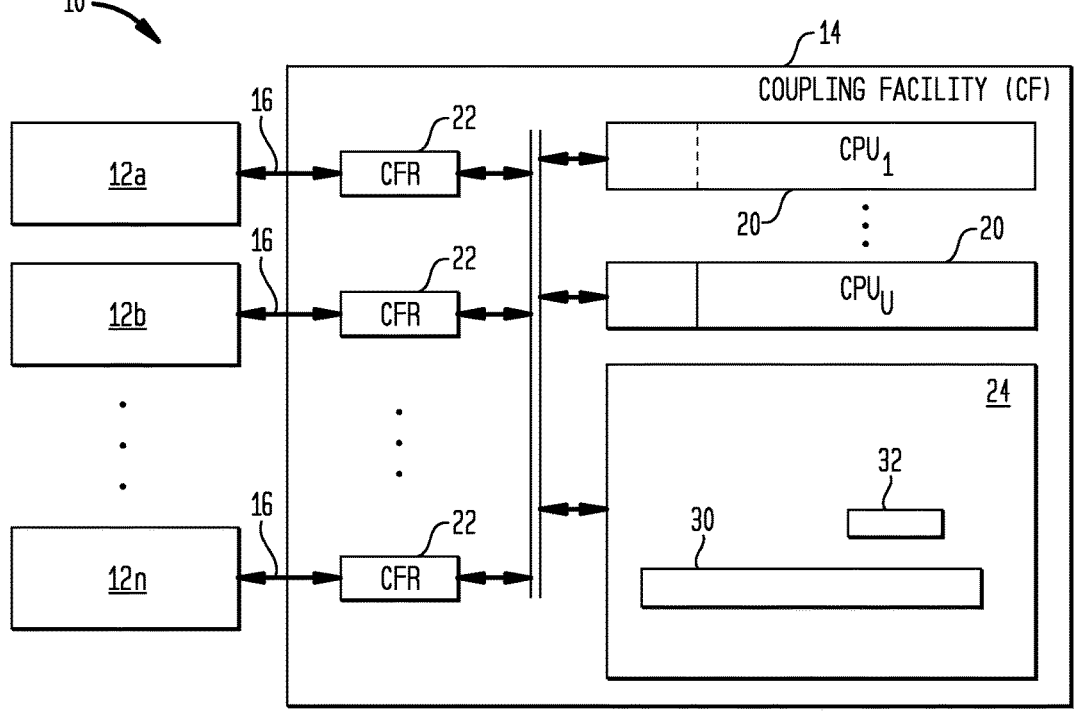
FIG. 1 is a block diagram representation of a geographically dispersed, parallel multiple processing environment in which the present invention may be used.

FIG. 1 shows a distributed, multi-system, shared data environment, or sysplex, 10. Sysplex 10 includes a multitude of central processing complexes 12a-12n interconnected to a coupling facility 14 through inter system channels 16. Preferably, each of the central processing complexes is a computer system operating according to the S/390 architecture of International Business Machines Corp. (IBM). The S/390 architecture is well known to represent the foundation for robust, high performance. In general, though, computers of any architecture having inter-system channels can be used for the central processing complexes 12. Each of the complexes 12 operates to execute one or more processes that may share data with one or more of the other complexes. The sharing of data by two or more processes is carried out through operation of the coupling facility 14.

The coupling facility 14 includes one or more central processing units 20, receivers 22, and storage unit 24. Receivers 22 are provided to connect the coupling facility to the inter-system channels 16. The storage 14 is, typically, a large storage. Storage 14, for example, may be partitioned into control storage 30 and non-control storage 32.

Figure 2:
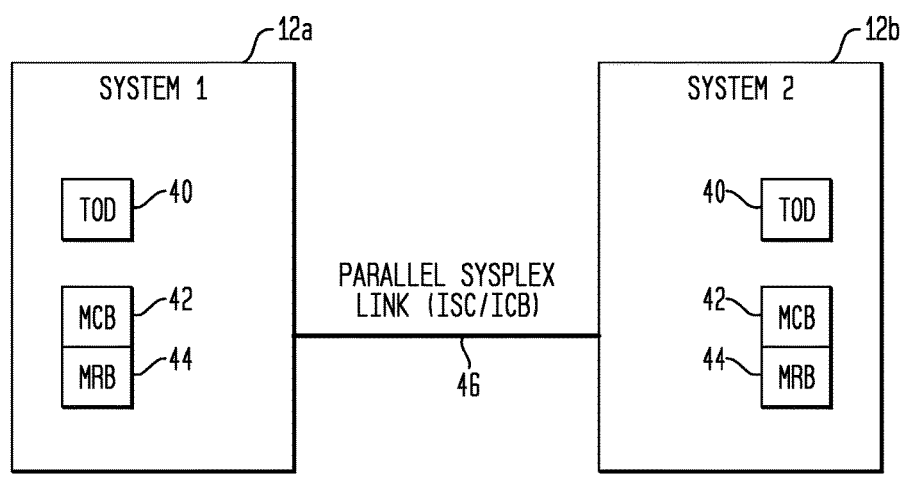
FIG. 2 is a more detailed representation of two of the computer systems of the computer cluster of FIG. 1.

FIG. 2 is a more detailed representation of two of the computer systems 12a and 12b of the sysplex 10 of FIG. 1. As represented in FIG. 2, each of the computer systems 12a and 12b includes a time of day (TOD) clock 40, an MCB 42 and an MRB 44, and the two computer systems are connected together by a point-to-point link 46.

The present invention relates to methods and systems for maintaining time synchronization among plural computers or computer systems, such as systems 12a and 12b of sysplex 10. In the preferred embodiment, the synchronization is based upon four measured time values:

1. the time at which the initiator sends a timing request (t0)
2. the time at which the timing request is received at the target (t1)
3. the time at which the target sends its response (t2)
4. the time at which the response is received at the initiator (t3)

Assuming that the time at the target differs from the time at the initiator by an amount, d, and that the transmission times on the link for the timing request and response are symmetric and have a value of x, the following equations hold:

$$t1 = t0 + d + x$$

$$t3 = t2 - d + x$$

From these equations, it can be shown that:

$$d = \tfrac{1}{2}[(t1 + t2) - (t3 + t0)]$$

So, estimating the time difference between the systems becomes a matter of collecting samples of the four time measurements, and making the systems agree upon the time becomes a matter of changing the rate of increment of one of the systems clocks, so that the values converge.

The protocol used in this invention uses a request-response transaction to obtain the four timestamps. This transaction has the form of a request/response message on a parallel sysplex link between two systems in which the first timestamp, t0, is obtained when the request is transmitted by one system; the second timestamp, t1, is obtained when the request arrives at the second system and an interrupt is generated; the third timestamp, t2, is obtained when the response is transmitted from the second system; the fourth timestamp, t3, is obtained when the response arrives at the first system and an interrupt is generated.

The timestamps are preferably obtained from the lowest level of firmware in the computer systems. More specifically, the lowest level of system firmware, which actually directs requests to the hardware, obtains the TOD value and places it in the transmitted data for the request or response. This same level of firmware obtains the TOD value when an interruption occurs, indicating the reception of a request or a response, and it stores the TOD value into the received data.

The messages used for this protocol are transmitted in the same manner as normal message traffic, but they are distinguished from normal message traffic by distinction information in the request.

Figure 3:
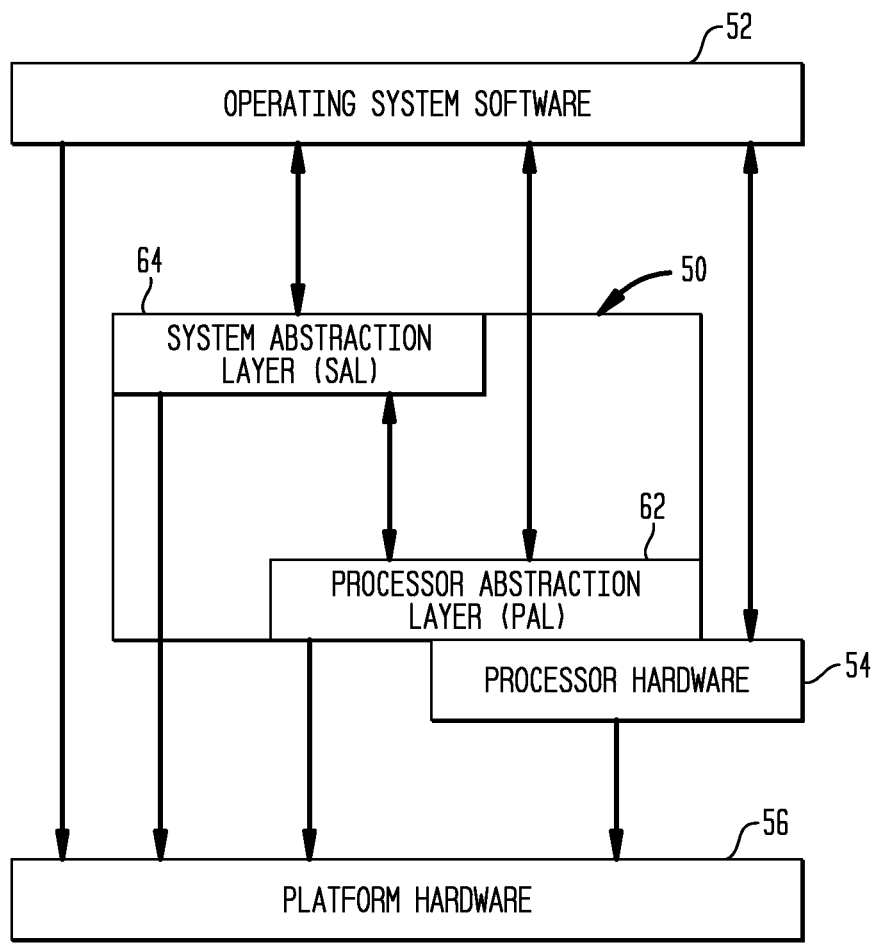
FIG. 3 illustrates different layers of a computer system.

As indicated above, the timestamps are preferably generated by the lowest level of system firmware. With reference to FIG. 3, in the preferred embodiment, this layer is microcode 50 that is between the operating system software 52 of the computer system and both the processor hardware 54 and the platform hardware 56 of the computer system.

System software is defined herein as the firmware and operating system (OS) that is executed by a single CPU in a single processor system, or is executed by a plurality of CPUs in a multi-processor system.

Firmware as used herein refers to processor routines that are stored in non-volatile memory structures such as read only memories (ROMs), flash memories, and the like. These memory structures preserve the code, referred to as microcode, stored in them even when power is shut off. Even though firmware is stored in non-volatile memory, firmware may be copied or shadowed to volatile memory. Typically, this is done for performance reasons. One of the principal uses of traditional firmware is to provide necessary instructions or routines that control a computer system when it is powered up from a shut down state, before volatile memory structures have been tested and configured. Firmware routines may also be used to reinitialize or reconfigure the computer system following various hardware events and to handle certain platform events like system interrupts.

For one embodiment, firmware includes two major components, the processor abstraction layer (PAL) 60 and the system abstraction layer (SAL) 62. The PAL encapsulates all processor model specific hardware. The PAL provides a consistent software interface to access the processor resources across different processor implementations. SAL is a platform specific firmware component that is typically provided by original equipment manufacturers (OEM) and BIOS vendors. The SAL is a firmware layer that isolates an operating system and other higher level software from implementation differences in the platform. Both the PAL and SAL, provide system initialization and boot strapping, machine check abort (MCA) handling, platform management interrupt handling, and other processor and system functions which vary across different implementations.

Operating systems (OS) interact with firmware to provide an environment in which applications can be executed by the CPU. By utilizing firmware, an OS can be designed to run on many different processing systems without re-writing the OS for each variation in platforms.

The preferred embodiment of the invention, as described above, has a number of important advantages. For example, the invention provides time synchronization using a message-based protocol over a reliable point-to-point connection. The invention makes use of the existing coupling-facility channel architecture, a point-to-point architecture, to perform synchronization that ensures synchronization to an accuracy on the order of a few microseconds or better. Because the preferred embodiment uses coupling-facility channels and associated hardware/microcode, the timestamps are accurate with a relatively constant latency. Existing technologies that do not use specialized hardware currently provide synchronization on the order of milliseconds, which does not meet the requirements of some of today's top-end computing systems. Also, the preferred embodiment of the invention uses a command/response protocol that makes use of pre-allocated hardware buffer space that eliminates the possibility of busy situations (e.g., buffer available) and therefore contributes to the capability to send and receive data on a regular and more frequent basis.

Because the message protocol utilized over the coupling-facility channels is at layer well below the program software (e.g., at the microcode level), the protocol is capable of inserting send and receive timestamps within messages such that the latency between the timestamp and when the message is actually transmitted/received is minimized. Latencies can occur in protocols that are implemented at the program level due to workloads and concurrent software activity within the OS. In synchronization protocols that make use of send/receive timestamps, variable latencies contribute directly to the error in time synchronization capability. Because coupling-facility channels have a known maximum latency, the accuracy of synchronization can be guaranteed, a critical and essential aspect of multi-system environments such as SYSPLEX that rely on synchronization at the microsecond level.

Figure 4:
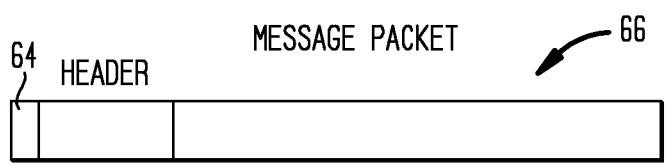
FIG. 4 illustrates a message format that may be used in the practice of this invention.

The message-base protocol utilized over coupling-facility channels is implemented such that it is transparent to the other facilities that utilize coupling-facility channels, such as the message facility and coupling facility. With reference to FIG. 4, this is preferably done by adding a bit 64 in the header of each message packet 66 that automatically causes the packet to be routed to the message-protocol microcode rather than to other facilities. Additionally, because the timing message packets are small and relatively infrequent, the performance impact on the coupling-facilities is minimal.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method of providing time synchronization among first and second computer systems using a transmission of messages between the first and second computer systems, each of the computer systems including hardware, a clock having a clock value, operating system software, and a layer of microcode operating between said hardware and said operating system software for interacting with said hardware, the method comprising:

using the microcode of the first computer system to obtain a first timestamp from the clock of the first computer system;

sending the first timestamp to the second computer system;

in response to the second computer system receiving the first timestamp, using the microcode of the second computer system to provide a second timestamp and a third timestamp;

sending the second timestamp and the third timestamp to the first computer system, wherein a defined transmission time is used to transmit the first, second and third timestamps between the first and second computer systems;

in response to the first computer system receiving the second timestamp and the third timestamp, using the microcode of the first computer system to obtain a fourth timestamp from the clock of the first computer system;

determining a time difference between the clock values of the first and second computer systems by using said first, second, third and fourth timestamps in a defined equation to determine a value, independent of said transmission time, for said time difference between the clock values of the first and second computer systems; and adjusting a timing synchronization among said first and second computer systems on the basis of said determined time difference between the clock values of the first and second computer systems by using said determined time difference to change a rate of increment of the clock value of one of the first and second computer systems to converge the clock values of the first and second computer systems; and wherein the using said first, second, third and fourth timestamps in a defined equation includes obtaining the defined equation including identifying first and second equations using said timestamps, said first equation including a positive value for said transmission time, and said second equation including a negative value for said transmission time; and combining the first and second equations to obtain the defined equation, wherein the result of the using the defined equation is independent of the transmission time.

2. A method according to claim 1, wherein said first and second computer systems are connected together by a point-to-point link, and further comprising:

transmitting the second and third timestamps from the second computer system to the first computer system over said point-to-point link.

3. A method according to claim 1, further comprising:

the first computer system sending to the second computer system a command message for said second and third timestamps.

4. A method according to claim 3, wherein said command message includes a bit instructing the second computer system to route said command message to the micro code of the second computer system.

5. A method according to claim 3, further comprising:

in response to receiving said command message, the second computer system sending a response to the micro code of the first computer system, said response including both the second and the third timestamps; and wherein the second timestamp indicates when said command message was received at the second computer system, and the third timestamp indicates when said response was sent by the second computer system.

6. A method according to claim 5, wherein:

the first timestamp indicates the time at which the first computer system sends said command message; and the fourth timestamp indicates the time at which the first computer system receives said response.

7. A method according to claim 6, wherein said first and second computer systems are connected together by a point-to-point link, and wherein:

the first computer system sending to the second computer the command message includes sending said command message, with the first timestamp, over said point-to-point link to the second computer system; and the second computer system sending said response to the first computer system includes sending said response, with the second and third timestamps, over said point-to-point link to the first computer system.

8. The method according to claim 1, wherein:

the first timestamp represents a time $t_0$ at which the first timestamp is sent to the second computer system;

the second timestamp represents a time $t_1$ at which the first timestamp is received by the second computer system;

the third timestamp represents a time $t_2$ at which the second and third timestamps are sent to the first computer system;

the fourth timestamp represents a time $t_3$ at which the first computer system receives the second and third timestamps;

each of the computer systems further includes non-volatile memory;

the layer of the microcode of each of the computer systems includes firmware stored in the non-volatile memory of said each computer system;

the hardware of each of the computer systems includes processor hardware and platform hardware;

the firmware of the microcode of each of the computer systems includes a system abstraction layer for interacting with the operating system software of said each computer system, and a processor abstraction layer for interacting with the processor hardware of said computer system; and the first and the fourth timestamps are generated by the processor abstraction layer of the firmware of the first computer system; and the second and third timestamps are generated by the processor abstraction layer of the firmware of the second computer system.

9. The method according to claim 1, wherein:

the first computer system sends messages to the second computer system, and the second computer system sends messages to the first computer system;

the using the microcode of first computer system includes using the microcode of the first computer system to insert the first timestamp within one of the messages transmitted from the first computer system to the second computer system to minimize the latency between the first time stamp and when said one of the messages is actually transmitted; and the using the microcode of the second computer system includes using the microcode of the second computer system to insert the third time stamp within one of the messages transmitted from the second computer system to the first computer system to minimize the latency between the third timestamp and when said one of the messages transmitted from the second computer system is actually transmitted.

10. The method according to claim 1, wherein:

the first timestamp represents a time $t_0$ at which the first timestamp is sent to the second computer system;

the second timestamp represents a time $t_1$ at which the first timestamp is received by the second computer system;

the third timestamp represents a time $t_2$ at which the second and third timestamps are sent to the first computer system;

the fourth timestamp represents a time $t_3$ at which the first computer system receives the second and third timestamps;

the determining a time difference between the clock values of the first and second computer systems includes:

identifying the defined equation expressing said time difference between the clock values of the first and second computer systems as a function of $t_0$, $t_1$, $t_2$ and $t_3$ and independent of the transmission time to transmit the first, second and third timestamps between the first and second computer systems; and using said defined equation to determine the time difference between the clock values of the first and second computer systems independent of the transmission time to transmit the first, second and third timestamps between the first and second computer systems.

11. The method according to claim 1, wherein the adjusting a timing synchronization among said first and second computer systems includes changing a rate of increment of the clock value of one of the first and second computer systems so that the clock values of the first and second computer systems converge.

12. A synchronization system for providing time synchronization among first and second computer systems using a transmission of messages between the first and second computer systems, each of the computer systems including hardware, a clock having a clock value, operating system software, and a layer of microcode operating between said hardware and said operating system software for interacting with said hardware, the synchronization system comprising:
- a first non-volatile memory unit and one or more processing units on the first computer system; and
- a second non-volatile memory unit and one or more processing units on the second computer system;
- the first non-volatile memory unit storing first code means within the microcode of the first computer system to obtain a first timestamp from the clock of the first computer system;
- the one or more processing units on the first computer system being configured to send the first timestamp to the second computer system;
- the second non-volatile memory unit storing second code means within the microcode of the second computer system to provide a second timestamp and a third timestamp in response to the second computer system receiving the first timestamp;
- the one or more processing units on the second computer system being configured to send the second and third timestamps to the first computer system, wherein a specified transmission time is used to transmit the first, second and third timestamps between the first and second computer systems; and
- wherein said first code means obtains a fourth timestamp from the clock of the first computer system in response to the first computer system receiving the second and third timestamps;
- the one or more processing units on the first computer system being further configured for determining a time difference between the clock values of the first and second computer systems by using said first, second, third and fourth time stamps in a defined equation to determine a value, independent of said transmission time, for said time difference between the clock values of the first and second computer systems; and for adjusting a timing synchronization among said first and second computer systems on the basis of said determined time difference between the clock values of the first and second computer systems by using said determined time difference to change a rate of increment of the clock value of one of the first and second computer systems to converge the clock values of the first and second computer systems; and
- wherein the using said first, second, third and fourth timestamps in a defined equation includes obtaining the defined equation including
- identifying first and second equations using said timestamps, said first equation including a positive value for said transmission time, and said second equation including a negative value for said transmission time; and
- combining the first and second equations to obtain the defined equation, wherein the result of the using the defined equation is independent of the transmission time.

13. A synchronization system according to claim 12, wherein said first and second computer systems are connected together by a point-to-point link, and wherein:
- the one or more processing units on the second computer system are further configured to send the second and third timestamps from the second computer system to the first computer system over said point-to-point link.

14. A synchronization system according to claim 12, wherein:
- the one or more processing units on the first computer system are further configured to send to the second computer system a command message over said point-to-point link for said second and third timestamps.

15. A synchronization system according to claim 14, wherein said command message includes a bit instructing the second computer system to route said command message to the micro code of the second computer system.

16. A synchronization system according to claim 14, wherein:
- the one or more processing units on the second computer system are further configured to send, in response to receiving said command message, a response to the micro code of the first computer system, said response including both the second and the third timestamps; and
- the second timestamp indicates when said command message was received at the second computer system, and the third timestamp indicates when said response was sent by the second computer system.

17. A program storage device readable by machine, including a program of instructions tangibly embodied in the program storage device and executable by the machine to perform a method for providing time synchronization among first and second computer systems using a transmission of messages between the first and second computer systems, each of the computer systems including hardware, a clock having a clock value, operating system software, and a layer of microcode operating between said hardware and said operating system software for interacting with said hardware, the method comprising:
- using the microcode of the first computer system to obtain a first timestamp from the clock of the first computer system;
- sending the first timestamp to the second computer system;
- in response to the second computer system receiving the first timestamp, using the microcode of the second computer system to provide a second timestamp and a third timestamp;
- sending the second timestamp and the third timestamp to the first computer system, wherein a defined transmission time is used to transmit the first, second and third timestamps between the first and second computer systems
- in response to the first computer system receiving the second timestamp and the third timestamp, using the microcode of the first computer system to obtain a fourth timestamp from the clock of the first computer system;
- determining a time difference between the clock values of the first and second computer systems by using said first, second, third and fourth timestamps in a defined equation to determine a value, independent of said transmission time, for said time difference between the clock values of the first and second computer systems; and
- adjusting a timing synchronization among said first and second computer systems on the basis of said determined time difference between the clock values of the first and second computer systems by using said determined time difference to change a rate of increment of the clock value of one of the first and second computer systems to converge the clock values of the first and second computer systems; and wherein the using said first, second, third and fourth timestamps in a defined equation includes obtaining the defined equation including identifying first and second equations using said timestamps, said first equation including a positive value for said transmission time, and said second equation including a negative value for said transmission time; and combining the first and second equations to obtain the defined equation, wherein the result of the using the defined equation is independent of the transmission time.

18. A program storage device according to claim 17, wherein said first and second computer systems are connected together by a point-to-point link, and said method further comprises transmitting the second and third timestamps from the second computer system to the first computer system over said point-to-point link.

19. A program storage device according to claim 17, wherein said method steps comprise the further step of the first computer system sending to the second computer system a command message for said second and third timestamps.

\* \* \* \* \*